US011212475B2

(12) United States Patent
Simony et al.

(10) Patent No.: US 11,212,475 B2
(45) Date of Patent: Dec. 28, 2021

(54) IMAGE SENSOR AND METHOD FOR CONTROLLING SAME

(71) Applicants: STMICROELECTRONICS (GRENOBLE 2) SAS, Grenoble (FR); STMICROELECTRONICS (CROLLES 2) SAS, Crolles (FR)

(72) Inventors: Laurent Simony, Grenoble (FR); Pierre Malinge, Bernin (FR)

(73) Assignees: STMICROELECTRONICS (GRENOBLE 2) SAS, Grenoble (FR); STMICROELECTRONICS (CROLLES 2) SAS, Crolles (FR)

( * ) Notice: Subject to any disclaimer, the term of this patent is extended or adjusted under 35 U.S.C. 154(b) by 0 days.

(21) Appl. No.: 16/890,944

(22) Filed: Jun. 2, 2020

(65) Prior Publication Data

US 2020/0382731 A1 Dec. 3, 2020

(30) Foreign Application Priority Data

Jun. 3, 2019 (FR) ...................................... 1905862

(51) Int. Cl.
*H04N 5/374* (2011.01)
*H04N 5/341* (2011.01)
*H04N 5/355* (2011.01)

(52) U.S. Cl.
CPC ............. *H04N 5/374* (2013.01); *H04N 5/341* (2013.01); *H04N 5/3559* (2013.01)

(58) Field of Classification Search
CPC ...... H04N 5/374; H04N 5/341; H04N 5/3559; H04N 5/37452; H04N 5/3575; H04N 5/369; H04N 5/378

(Continued)

(56) References Cited

U.S. PATENT DOCUMENTS 6,727,946 B1 * 4/2004 Zhao ...................... H04N 5/363
250/208.1
6,919,551 B2 * 7/2005 Barna ...................... H03F 3/08
250/214 R (Continued)

FOREIGN PATENT DOCUMENTS

EP 2 109 306 A2 10/2009
WO 2011/155442 A1 12/2011

OTHER PUBLICATIONS

U.S. Appl. No. 16/890,877, filed Jun. 2, 2020, Image Sensor and Method for Controlling Same.

(Continued)

*Primary Examiner* — Yogesh K Aggarwal
(74) *Attorney, Agent, or Firm* — Seed IP Law Group LLP

(57) ABSTRACT

A sensor includes pixels each including: a first transistor and a first switch in series between a first node and an internal node of the pixel, a gate of the first transistor being coupled to a second node; a capacitive element, a first terminal of which is connected to the second node; and a plurality of assemblies each including a capacitance in series with a second switch coupled to the internal node. The sensor includes a circuit configured to control, each time a voltage is stored in one of the assemblies, the interruption of a current between the first node and the internal node: by switching a first potential applied to a second terminal of the capacitive element; or by opening the first switch.

20 Claims, 5 Drawing Sheets

(58) Field of Classification Search
USPC ........ 348/294–324; 250/208.1; 257/290–292
See application file for complete search history.

(56) References Cited

U.S. PATENT DOCUMENTS

| | | | |
|---|---|---|---|
| 10,200,644 B2 | 2/2019 | Do et al. | |
| 2001/0033337 A1* | 10/2001 | Sakuragi | H04N 5/3742 |
| | | | 348/302 |
| 2004/0207740 A1* | 10/2004 | Rossi | H04N 5/3575 |
| | | | 348/308 |
| 2004/0263656 A1 | 12/2004 | Simony | |
| 2005/0270394 A1 | 12/2005 | Dierickx et al. | |
| 2008/0122962 A1 | 5/2008 | Shah | |
| 2011/0242381 A1 | 10/2011 | Sakakibara et al. | |
| 2013/0161494 A1 | 6/2013 | Sohn | |
| 2014/0239161 A1 | 8/2014 | Meynants et al. | |
| 2016/0088251 A1 | 3/2016 | Luo et al. | |
| 2018/0234652 A1 | 8/2018 | Sugawa et al. | |
| 2018/0332247 A1 | 11/2018 | Do et al. | |
| 2020/0312896 A1 | 10/2020 | Simony | |
| 2020/0382738 A1 | 12/2020 | Malinge et al. | |

OTHER PUBLICATIONS

U.S. Appl. No. 16/829,837, filed Mar. 25, 2020, Pixel and Method of Controlling the Same.

* cited by examiner

IMAGE SENSOR AND METHOD FOR CONTROLLING SAME

BACKGROUND

Technical Field

The present disclosure relates generally to image sensors, and more particularly image sensors of the global shutter type.

Description of the Related Art

A global-shutter sensor comprises a pixel matrix, generally arranged in rows and columns. The pixels of a global-shutter sensor are commonly called global-shutter pixels.

In a global-shutter sensor, an integration phase during which an image is captured by the sensor is shared by all the pixels of the sensor, or in other words, simultaneous for all the pixels of the sensor. More particularly, the integration phase begins by initializing, simultaneously for each pixel, a photo-sensitive area of the pixel. The integration phase ends when, simultaneously for each pixel, a voltage representative of the photogenerated charges accumulated, since the beginning of the integration phase, in the photosensitive area of the pixel is stored in the pixel. The voltages stored in the pixels of the sensor are next read sequentially, generally by simultaneously reading all of the pixels of the same row of the sensor, the rows being read one after the other.

BRIEF SUMMARY

There is a desire for a global-shutter image sensor, and a method for controlling such a sensor, addressing all or some of the drawbacks of known global-shutter image sensors and methods for controlling them.

One embodiment addresses all or some of the drawbacks of known global-shutter image sensors and known methods for controlling them.

One embodiment provides an image sensor comprising a matrix of pixels each including:

a first transistor and a first switch that are connected in series between a first node configured to receive a first potential and an internal node of the pixel, a gate of the first transistor being coupled to a floating diffusion node of the pixel;

a capacitive element, a first terminal of which is connected to the floating diffusion node of the pixel; and a plurality of assemblies each comprising a capacitance connected in series with a second switch coupling the capacitance to the internal node of the pixel, the sensor further comprising a circuit configured to control, each time a voltage is stored in one of the assemblies of one of said pixels, the interruption of a current circulating between the first node and the internal node of the pixel:

by controlling a switching, from a first level to a second level, of a first potential applied to a second terminal of the capacitive element of the pixel, irrespective of said pixel and said assembly of the pixel in which said storage is done; or by controlling an opening of the first switch of the pixel, irrespective of said pixel and said assembly of the pixel in which said storage is done.

According to one embodiment, in each of said pixels, a source of the first transistor is not coupled to a constant-polarization current source.

According to one embodiment, the circuit is configured, during said storage, to control a switching of the potential applied to the first node, from a third level, preferably low, to a fourth level, preferably high, before the interruption of the current.

According to one embodiment, the circuit is configured, during said storage, to separate, by a duration, the control of the interruption of the current from the control of the switching, from the third to the fourth level, of the potential applied to the first node, said duration being identical irrespective of said pixel and said assembly of the pixel in which said storage is done.

According to one embodiment, the circuit is configured, during said storage, to maintain the fourth level of the potential applied to the first node, at least until the interruption of the current.

According to one embodiment, the circuit is configured, during said storage, to control an opening of the second switch of said assembly after the interruption of the current, and preferably, to maintain the fourth level of the potential applied to the first node at least until said opening of the second switch.

According to one embodiment, the circuit is configured, during said storage, to keep the first switch of the pixel and the second switch of said assembly closed before the switching, from the third to the fourth level, of the potential applied to the first node.

According to one embodiment, the circuit is further configured, during said storage, to keep the first switch of the pixel and the second switch of said assembly closed, at least until the interruption of the current.

Another embodiment provides a method for controlling an image sensor comprising a matrix of pixels each including:

a first transistor and a first switch that are connected in series between a first node configured to receive a first potential and an internal node of the pixel, a gate of the first transistor being coupled to a floating diffusion node of the pixel;

a capacitive element, a first terminal of which is connected to the floating diffusion node of the pixel; and a plurality of assemblies each comprising a capacitance connected in series with a second switch coupling the capacitance to the internal node of the pixel, the method comprising steps of storing voltages in said plurality of assemblies of said pixels, each storage step in an assembly of one of the pixels comprising:

controlling the interruption of a current circulating between the first node and the internal node of the pixel:

by controlling a switching, from a first level to a second level, of a first potential applied to a second terminal of the capacitive element of the pixel, irrespective of said pixel and said assembly of the pixel in which said storage is done; or by controlling an opening of the first switch of the pixel, irrespective of said pixel and said assembly of the pixel in which said storage is done.

According to one embodiment, a source of the first transistor is not coupled to a constant-polarization current source.

According to one embodiment, said storage step comprises controlling a switching of the potential applied to the first node, from a third level, preferably low, to a fourth level, preferably high, before the interruption of the current.

According to one embodiment, for each storage step, an identical duration separates the control of the interruption of the current from the control of the switching, from the third level to the fourth level, of the potential applied to the first node.

According to one embodiment, during said storage, the potential applied to the first node is kept at the fourth level, at least until the interruption of the current.

According to one embodiment, during said storage:

the second switch of said assembly is open after the interruption of the current, the potential applied to the first node preferably being kept at the fourth level at least until said opening of the second switch; and/or the first switch of the pixel and the second switch of said assembly are kept closed before the switching, from the third to the fourth level, of the potential applied to the first node.

According to one embodiment, during said storage:

the first switch of the pixel and the second switch of said assembly are kept closed at least until the interruption of the current.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, electronic devices in which a global-shutter image sensor can be provided have not been described, the embodiments and modes of implementation being compatible with standard electronic devices comprising a global-shutter image sensor. Furthermore, the read circuits of a pixel have not been described in detail, the described embodiments and modes of implementation being compatible with the usual read circuits, in particular with the read circuits of a 4T pixel ("four-transistor" pixel).

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
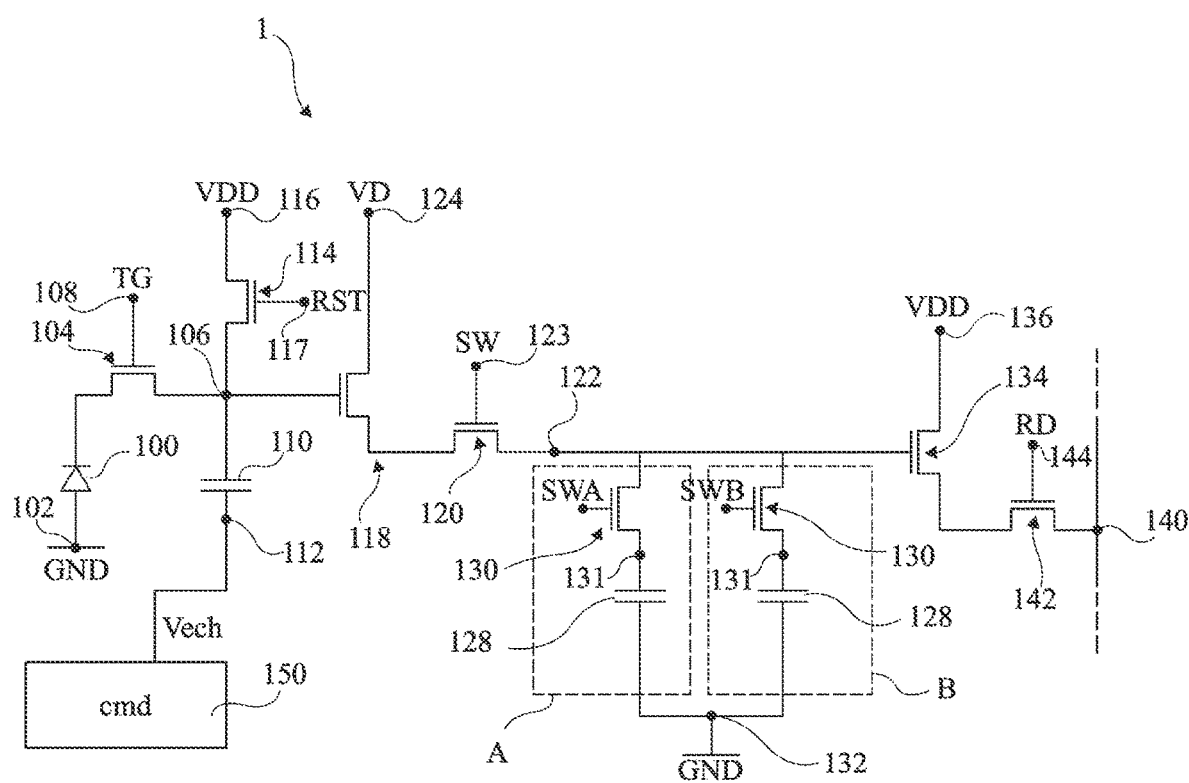
FIG. 1 shows an embodiment of a circuit of a pixel of a global-shutter sensor.

FIG. 1 shows an embodiment of a circuit of a pixel 1 of a global-shutter sensor.

The pixel 1 comprises a photosensitive area 100, also called photoconversion area 100, configured to accumulate charges photogenerated from the light that it receives, for example, to accumulate electrons from photogenerated electron-hole pairs.

In this example, the photosensitive area 100 is a photodiode whereof one terminal, here the anode, is coupled, preferably connected, to a node 102 for applying a reference potential such as the ground GND. Preferably, the photodiode is a so-called pinned photodiode.

A device 104 for transferring photogenerated charges accumulated in the area 100 toward a floating diffusion node 106 is connected between the area 100 and the node 106.

In the example of FIG. 1, the device 104 is a MOS transistor whereof both conduction terminals (source and drain) are coupled, preferably connected, respectively to the zone 100 and the node 106 and whereof the control terminal (gate) is connected to a node 108 for applying a control potential TG. More particularly, in the illustrated example where the area 100 is a pinned photodiode whereof the anode is connected to the ground GND, the transistor 104 has an N-channel and is connected between the cathode of the photodiode 100 and the node 106. Preferably, the transistor 104 constitutes a transfer gate between the photodiode 100 and the node 106, that is to say, a MOS transistor whereof the terminal on the side of the photodiode 100 is at least partially formed by a doped semiconductor region of the photodiode 100, here by the cathode of the photodiode 100.

A capacitive element 110 is connected between the node 106 and a node 112 for applying a potential. In this embodiment, the node 112 receives a control signal or potential Vech.

The node 106 is connected to a node 116 for applying a potential, in this example a positive supply potential VDD of the pixel 1, by a switch 114. The switch 114 is controlled by a control potential RST. The switch 114 is, for example, a MOS transistor, in this example with N-channel, the conduction terminals of which are coupled, preferably connected, to the respective nodes 106 and 116, and the control terminal (gate) of which is coupled, preferably connected, to a node 117 for applying the potential RST.

The node 106 is further connected to the control terminal of a transistor 118, preferably a MOS transistor, and more particularly in this example, an N-channel MOS transistor.

The transistor 118 is connected in series with the switch 120, between an internal node 122 of the pixel 1 and a node 124 for applying a control potential VD. In practice, the signal or potential VD is supplied by a supply source, preferably shared by all of the pixels 1 of the sensor, for example, by a voltage regulator.

The switch 120 is controlled by a control potential, referenced SW in this embodiment, applied to a node 123 coupled, preferably connected, to a control terminal of the switch 120. The switch 120 is, for example, a MOS transistor, in this example an N-channel transistor, the gate of which is connected to the node 123 for applying the potential SW.

In this embodiment, the switch 120 is connected between the node 122 and a conduction terminal of the transistor 118, namely the source of the transistor 118 in this example. More specifically, in this example, the conduction terminals of the transistor 120 are respectively connected to the node 122 and the source of the transistor 118.

In an embodiment variant that is not illustrated, the switch 120 is connected between the node 124 and a conduction terminal of the transistor 118, the other conduction terminal of the transistor 118 then being connected to the node 122.

The transistor 118 is mounted as a non-biased source follower. In other words, the source of the transistor 118 is not connected or coupled to any source of a constant or substantially constant bias current.

The pixel 1 further comprises two assemblies A and B (in dotted lines in FIG. 1). The assemblies A and B are identical, with the exception of any manufacturing dispersions. Each assembly A, B is made up of a capacitance 128 in series with a switch 130. The assemblies A and B are connected to the node 122. The switch 130 of the assembly A, respectively B, is controlled by a control potential SWA, respectively SWB.

More particularly, in each of the assemblies A and B, the switch 130 couples the capacitance 128 to the node 122. In other words, the switch 130 is connected between the node 122 and a node 131 for connecting the switch 130 to the capacitance 128, the capacitance 128 then being connected between the node 131 and a node 132 for applying a potential, here the ground GND. Each of the assemblies A and B is therefore connected between the nodes 132 and 122.

Each switch 130 is, for example, a MOS transistor, in this example an N-channel transistor, the drain of which is connected to the node 122, the source of which is connected to the corresponding node 131, and the gate of which receives the corresponding potential SWA or SWB.

Preferably, the capacitances 128 of the assemblies A and B correspond to capacitive deep trench isolations (CDTI). As an example, a CDTI capacitance corresponds to a trench penetrating a semi-conductive region, the trench being filled with a conductive material isolated from the semi-conductive region by an isolating layer covering the walls and the bottom of the trench. The conductive material constitutes a first electrode of the capacitance, in this example coupled to the node 132, and the semi-conductive region corresponds to a second electrode of the capacitance. In the case where the capacitances 128 are CDTI capacitances, the potential of the node 132 is preferably negative.

As will be seen in more detail hereinafter, each assembly A, B is configured so that a voltage is stored therein, across the terminals of the capacitance 128 of the assembly. More particularly, each assembly A, B is configured to store a voltage representative of a state, that is to say, a potential level, of the node 106.

Providing two assemblies A, B makes it possible to store, in one of the assemblies A and B, a first voltage representative of an initial state of the node 106, at the beginning of an integration phase, and in the other of the assemblies A and B, a second voltage representative of a state of the node 106 at the end of the integration phase.

In the remainder of the description, a wanted signal or differential of the pixel 1 refers to the difference between the first and second voltages of a same integration phase. This wanted signal is representative of the difference between the state of the node 106 at the beginning of the integration phase, and the state of the node 106 at the end of the integration phase, that is to say, the quantity of light received by the area 100 of the pixel 1 during this integration phase.

The node 122 is further connected to the gate of a MOS transistor 134, in this example an N-channel transistor. A conduction terminal of the transistor 134, in this example the drain, is connected to a node 136 for applying the supply potential VDD, the other conduction terminal of the transistor 134, in this example the source, being connected to an output node 140 of the pixel, and more specifically to a node 140, or conductive rail, shared by all of the pixels of a same column of a pixel matrix of the image sensor.

In this embodiment, a switch 142 couples a conduction terminal, here the source, of the transistor 134 to the node 140, the other conduction terminal of the transistor 134, here the drain, preferably being connected to the node 136. The switch 142 is controlled by a control potential RD applied to a node 144 coupled, preferably connected, to a control terminal of the switch 142. The switch 142 is, for example, a MOS transistor, in this example an N-channel transistor, the conduction terminals of which are coupled, preferably connected, respectively to the node 140 and to the source of the transistor 134, and the gate of which is connected to the node 144 for applying the potential RD.

In an embodiment variant that is not illustrated, the switch 142 is connected between the transistor 134 and the node 136.

Figure 1A:
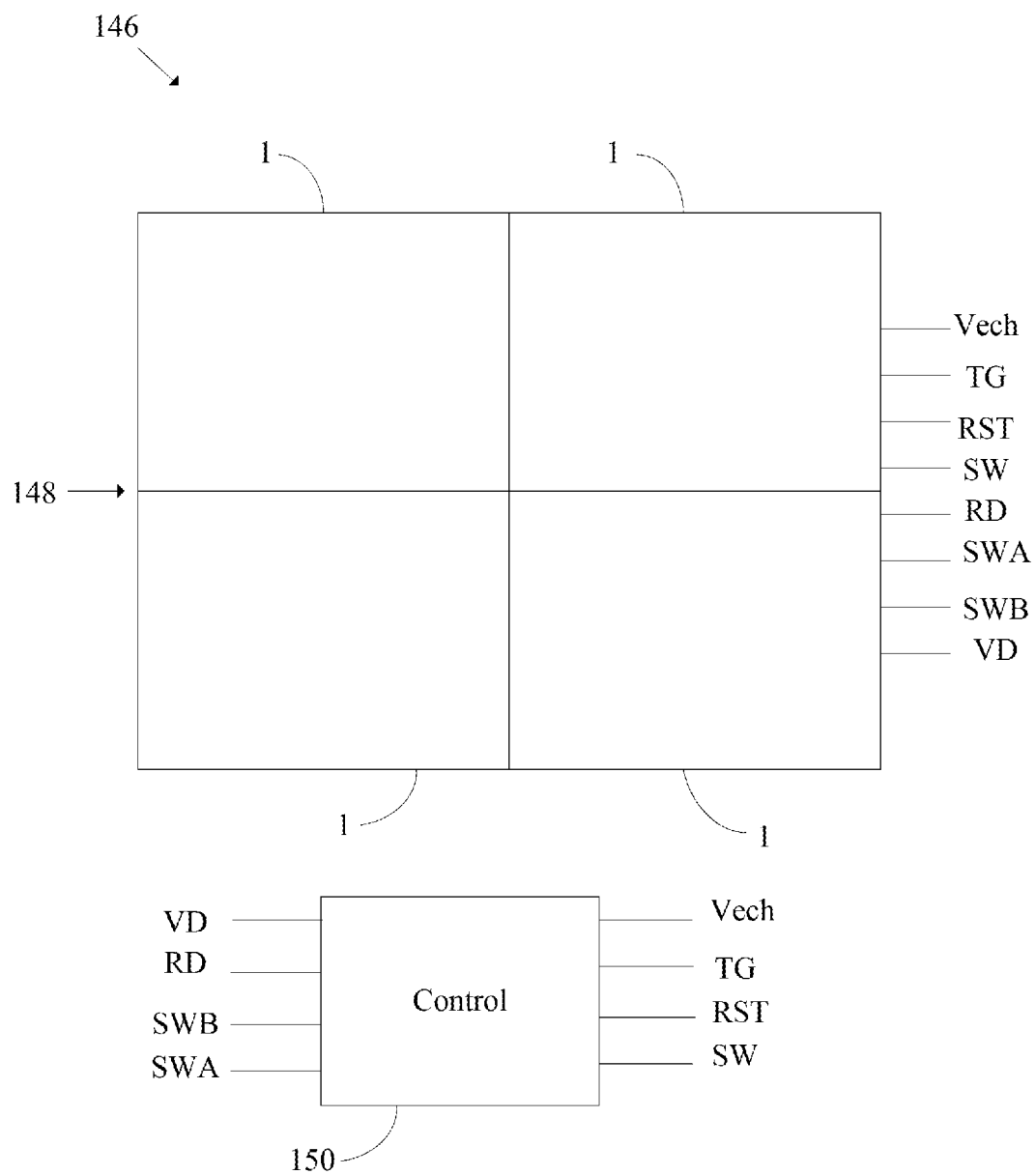
FIG. 1A is a block diagram of an image sensor include a matrix of pixels according to FIG. 1.

FIG. 1A is directed to an image sensor 146 that includes a matrix 148 of the pixels 1 and a control circuit 150 for controlling the matrix 148 of pixels 1.

In FIG. 1, the control circuit 150 (cmd) for controlling the pixel 1 is also shown. Preferably, the circuit 150 is shared by all of the pixels 1 of the pixel matrix 148 of the sensor 146. The circuit 150 is configured to supply the potential Vech of each pixel 1. More generally, the circuit 150 is preferably configured to supply the signals, or potentials, Vech, RST, TG, SWA, SWB, VD, SW and RD for controlling the pixels 1 of the matrix. During operation, during each global operating phase comprising an integration phase, all of the pixels receive the same control signals, or in other words, are controlled in the same way. Then, between two successive global phases, during a reading phase of the voltages stored in the assemblies A and B of each pixel 1, the circuit 150 controls the rows of pixels 1 one after the other, by supplying the same control signals to all of the pixels of the row of pixels in the process of being read.

Although this has not been illustrated here, the sensor 146 comprising the matrix 148 of pixels 1 further comprises one or more read circuits of the pixels. For example, the sensor comprises one read circuit per column of pixels 1, this read circuit then being coupled, preferably connected, to the common rail or node 140 of the pixels of the column.

An operating mode of the sensor 146 comprising the matrix 148 of pixels 1 will now be described in connection with FIG. 2.

Figure 2:
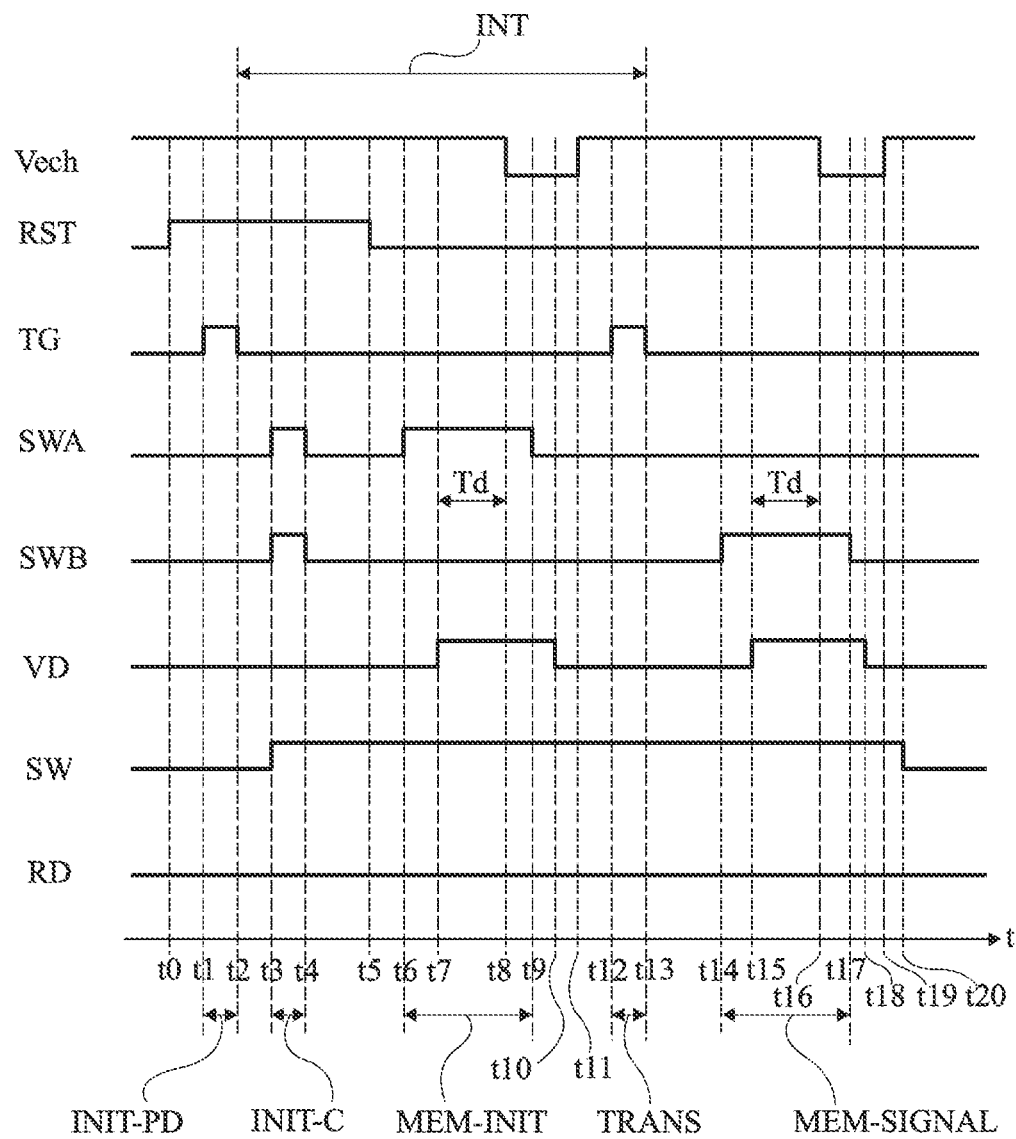
FIG. 2 shows timing diagrams illustrating an implementation mode of a control method of the pixel of FIG. 1.

FIG. 2 shows timing diagrams illustrating an implementation mode of a control method of the pixel 1 of FIG. 1. More particularly, FIG. 2 shows timing diagrams of control signals Vech, RST, TG, SWA, SWB, VD, SW and RD of the pixel 1.

The signals Vech, RST, TG, SWA, SWB, VD, SW and RD are switched between low levels and high levels. It is considered here, as an example, that the signals RST, TG, SWA, SWB, VD, SW and RD are by default at their low levels, the transistor, or transfer gate, 104 then preventing the passage of charges from the area 100 to the node 106, and the switches 114, 120, 130 and 142 being open. Furthermore, in this embodiment, the signal Vech is at its high level by default.

It will be noted that the potential corresponding to the low level of one of the signals RST, TG, SWA, SWB, VD, SW and RD can be different from the potential corresponding to the low level of another of these signals, and/or that the potential corresponding to the high level of one of these signals can be different from the potential corresponding to the high level of another of these signals.

Furthermore, in the description given below of FIG. 2, a signal switched from a first level to a second level is kept at this second level as long as it is not indicated that the signal is switched from the second level to the first level.

Furthermore, in the description given below of FIG. 2, when reference is made to the voltage of a node, it is considered, unless otherwise indicated, that this involves the voltage between the node and the ground GND.

At a moment t0, the switch 114 is switched from the open state to the closed state by controlling the switching of the potential RST from its low level to its high level. As a result, the voltage VDD at the node 116 finds itself at the node 106. This switching of the potential is done simultaneously for all of the pixels 1 of the sensor.

At the following moment t1, the transistor 104 is turned on by controlling the switching of the signal TG from its low level to its high level. In other words, the passage of photogenerated charges is authorized from the area 100 toward the node 106, via the transistor 104. This corresponds to a step INIT-PD for initializing the area 100, that is to say, the area 100 is emptied of photogenerated charges, here electrons, that could be located therein, these charges being discharged toward the node 106, then toward the node 116. This switching of the potential TG is done simultaneously for all of the pixels 1 of the sensor.

At the following moment t2, the transistor 104 is turned off by controlling the switching of the signal TG from its high level to its low level. This isolates the area 100 from the node 106, preventing photogenerated charges from going from the area 100 to the node 106. This switching from the on state to the off state of the transistor 104 marks the end of the step INIT-PD and the beginning of an integration period INT of the pixel 1 during which charges, here electrons, are photogenerated and accumulated in the area 100. This switching of the potential TG is done simultaneously for all of the pixels 1 of the sensor, as a result of which the integration phase INT begins simultaneously for all of the pixels 1 of the sensor.

At a following moment t3, the voltages across the terminals of the capacitances 128 are preferably initialized (step INIT-C). To that end, while the signal, or potential, VD is at its low level, the switches 120 and 130 are closed while controlling the switching of the signals SW, SWA and SWB from their low levels to their high levels. These switching operations can, in practice, not be simultaneous, unlike what is shown in FIG. 2. Because the signal VD is kept at its low level, the transistor 118 receives the potential VDD on its gate, and the switches 120 and 130 are closed, the low level of the signal VD is, for each capacitance 128, found on the corresponding node 131, thus determining an initialization voltage of the capacitances 128.

At a following moment t4 marking the end of step INIT-C, the switches 130 are open while controlling the switching of the signals SWA and SWB from their high levels to their low levels. As a result, the capacitances 130 are then electrically isolated from the node 122, the voltage across the terminals of each capacitance 128 then being equal to the aforementioned initialization voltage.

The initialization phase INIT-C of the capacitances 128, in other words the control sequence described in relation with the moments t3 and t4, is carried out simultaneously for all of the pixels 1 of the sensors.

At the following moment t5, the switch 114 is turned off by controlling the switching of the signal RST from its high level to its low level. The node 106 is then isolated from the node 116. The potential present at the node 106 after the opening of the switch 114 is called initialization level, or reset level. This switching of the signal RST is done simultaneously for all of the pixels 1 of the sensor.

A voltage representative of the initialization level is next stored (step MEM-INIT) across the terminals of the capacitance 128 of one of the assemblies A and B, in this example the assembly A. The step MEM-INIT is done simultaneously for all of the pixels 1 of the sensor.

The step MEM-INIT begins, at a moment t6 following the moment t5, with the closing of the switch 130 of the assembly A, by controlling the switching of the signal SWA from its low level to its high level.

From the moment t6 to a following moment t7, the switch 120 and the switch 130 of the assembly A being closed, the low level of the voltage VD finds itself on the capacitance 128 of the assembly A, on the corresponding node 131.

Then, at the moment t7, while the switch 120 is kept closed (SW at its high level), the switch 130 of the assembly B is kept open (signal SWB at its low level) and the potential Vech is at its high level, the voltage VD is switched from its low level to its high level, or, in other words, the signal VD is switched to its high level.

Thus, from the moment t7, a current circulates between the nodes 124 and 122. Indeed, from the moment t7, the transistor 118 is first in the ohmic state and the voltage across the terminals of the capacitance 128 of the assembly A increases with the potential VD. The transistor 118 next enters the saturation state and the voltage across the terminals of the capacitance 128 of the assembly A then has a value depending primarily on the potential at the node 106, here the initialization level. More accurately, when the transistor 118 is in the saturated state, the voltage across the terminals of the capacitance 128 converges asymptotically toward a voltage depending on the potential of the node 106 and the threshold voltage of the transistor 118. Thus, the voltage across the terminals of the capacitance 128 depends not only on the potential of the node 106, but also on a duration Td during which the current can circulate between the nodes 122 and 124, that is to say, during which the voltage is allowed to evolve across the terminals of the capacitance 128, the starting point of this duration Td here being the moment t7.

In this embodiment, at the end of the period Td, the circulation of the current between the nodes 122 and 124 is interrupted, causing the passage to the off state of the transistor 118. It will be noted that, from at least the moment t7, and until at least the moment t8, the potential Vech is kept at its high level.

To that end, at the moment t8, separated from the moment t7 by the duration Td, the potential of the node 106 is lowered by controlling the switching of the potential Vech from its high level to its low level. The difference between the high and low levels of the potential Vech is chosen such that switching from the high level to the low level of the potential Vech causes a decrease of the potential of the node 106, therefore of the gate/source voltage, denoted Vgs, of the transistor 118, that is sufficient for the current circulating in the transistor 118 after this switching to be at least 10 times lower, preferably at least 100 times lower, or even 1000 times lower, than the current that was circulating therein before the switching. Thus, the current circulating after this switching of the signal Vech is considered to be negligible or nil, or in other words, it is considered that the current in the transistor 118 is interrupted by this switching of the signal Vech. One skilled in the art is able to choose the value of the difference between the high and low levels of the signal Vech to obtain the operation described above. As an example, the high and low levels of the potential Vech are such that the decrease of the potential of the node 106 is in the order of 200 mV or more.

As a result, from the moment t8, the voltage across the terminals of the capacitance 128 of the assembly A no longer evolves, this voltage being representative of the initialization level of the node 106 before the switching of the potential Vech from its high level to its low level.

At a following moment t9, the switch 130 of the assembly A is turned on by controlling the switching of the signal SWA from its high level to its low level. The opening of the switch 130 makes it possible to isolate the node 131, therefore the capacitance 128, from the node 122, so as to keep, or retain, the voltage stored across the terminals of the capacitance 128 of the assembly A until it is read. This opening of the switch 130 of the assembly A marks the end of the storage phase MEM-INIT.

At a following moment t10, the signal VD is switched from its high level to its low level. This switching of the signal VD is done simultaneously for all of the pixels 1 of the sensor.

After the opening of the switch 130 of the assembly A, and preferably, the switching of the potential VD to its low level, the potential Vech is switched from its low level to its high level, without this altering the voltage stored across the terminals of the capacitance 128 of the assembly A. In this example, this switching takes place at a moment t11 following the moment t10. This switching is done simultaneously for all of the pixels 1 of the sensor.

It will be noted that, unlike the duration Td, the durations separating the respective moments t9, t10 and t11 from the moment t7 are not critical, due to the fact that the voltage across the terminals of the capacitance no longer evolves upon switching of the signal Vech to its low level.

At a following moment t12, the transistor 104 is switched to the on state by controlling the switching of the signal TG from its low level to its high level. At a following moment t13, the transistor 104 is turned off by controlling the switching of the signal TG from its high level to its low level. Thus, between the moments t12 and t13, the photo-generated and accumulated charges, here the electrons, in the area 100 from the moment t2 to the moment t13, are transferred to the node 106 (step TRANS) due to the fact that the signal TG is at its high level and the electric potential of the node 106 is higher than that of the cathode of the photodiode 100. The potential of the node 106 then decreases by a value determined by the number of transferred charges. The potential of the node 106 after switching of the transistor 104 from the on state to the off state is called signal level and is representative of the number of charges photogenerated and accumulated in the area 100 between the moments t2 and t13. In other words, the state of the node 106 after the moment t13 is representative of the quantity of light received by the area 100 between these moments t2 and t13. The step TRANS is done simultaneously for all of the pixels of the sensor 1. The moment t13 marks the end of the integration period INT shared by all of the pixels 1 of the sensor.

The global operating phase of the sensor then continues with the storage (step MEM-SIGNAL) of a voltage representative of the signal level of the node 106. More particularly, this voltage is stored across the terminals of the capacitance 128 of the assembly A or B that has not yet been used to store a potential level of the node 106 during step MEM-INIT, that is to say, across the terminals of the capacitance 128 of the assembly B in this example. The step MEM-SIGNAL is done simultaneously for all of the pixels 1 of the sensor.

To that end, from a following moment t14, the control sequence described in connection with the successive moments t6, t7, t8 and t9 is repeated at successive moments t14, t15, t16 and t17, respectively, with the difference that instead of switching the signal SWA at the moments t6 and t9, it is the signal SWB that is switched, similarly to the signal SWA, at the respective moments t14 and t17, the moment t17 marking the end of the MEM-SIGNAL phase.

During the MEM-SIGNAL phase, the moments t15 and t16 are separated from one another by a duration Td, preferably identical to that separating the moments t7 and t8.

At a following moment t18, the signal VD is switched from its high level to its low level. This switching of the signal VD is done simultaneously for all of the pixels 1 of the sensor.

After the opening of the switch 130 of the assembly B, and preferably, the switching of the potential VD to its low level, the potential Vech is switched from its low level to its high level, without this altering the voltage stored across the terminals of the capacitance 128 of the assembly B. In this example, this switching takes place at a moment t19 following the moment t18. This switching is done simultaneously for all of the pixels 1 of the sensor.

In this example, at the following moment t20, the switch 120 is turned off by controlling the switching of the signal SW from its high level to its low level. This makes it possible to isolate the node 122 from the transistor 118, therefore from the node 124. This makes it possible to avoid any alteration, by the transistor 118, of the voltages stored across the terminals of the capacitances 128. This switching is preferably simultaneous for the pixels 1 of the sensor. Thus, in this example, the moment t20 marks the end of the global operating phase of the sensor, or global acquisition and storage phase of an image by the sensor.

The pixels 1 are next read. The reading of the pixels 1 is done line by line, that is to say, one line of pixels 1 after another. When a line of pixels 1 is in the process of being read, all of the pixels 1 of the line receive the same control signals, such that all of the pixels of the line are read at the same time.

The phase for reading the voltage stored across the terminals of the capacitance of one of the assemblies A and B consists, while the switch 120 is kept open to prevent the circulation of a current between the nodes 122 and 124, of closing the switch 130 of this assembly and the switch 142, in order to obtain, on the node 140, a potential representative of this stored voltage. A reading phase is carried out for one of the assemblies A and B, then a reading phase is carried out for the other of these assemblies A and B.

Preferably, before each reading phase of an assembly, the potential of the node 122 is initialized, that is to say, placed at a determined value, by closing, then reopening the switch 120 while the potential VD is kept at its low level.

Once all of the pixels of the sensor have been read, a new global acquisition and storage phase of an image, as described in relation with the moments t1 to t20, can be implemented. The difference between the high and low levels of the signal Vech, the difference between the high and low levels of the signal VD and preferably the duration Td have identical respective values irrespective of the considered pixel and/or the considered assembly A or B during the implementation of the steps MEM-INIT and MEM-SIGNAL.

The wanted signal of the pixel 1 corresponds to a difference between a voltage representative of an initialization level of the node 106, and a voltage representative of a signal level of the node 106. Providing two voltages in order to define the wanted signal of the pixel corresponds to a correlated double sampling. The pixel 1 is therefore compatible with existing read circuits implementing a correlated double sampling. In particular, according to the read circuit used to read the pixel 1, one may choose to adapt the order in which the assemblies A and B are read.

In the method described above, the storage of a voltage across the terminals of the capacitance of the assembly A, respectively B, is ensured through the opening of the switch 130 of this assembly. However, the value of this voltage, at the time when it is stored, is determined through the identical sequence or succession of steps described in connection with the moments t7 and t8, or t15 and t16, as well as by the state of the node 106 during the implementation of this sequence of steps. In particular, because this succession of steps is implemented using like control signals, namely in this embodiment the potential VD and the potential Vech, preferably with the same duration Td, and the assemblies A and B are identical, no shift is introduced into the wanted signal of the pixel.

To interrupt the current circulating between the nodes 122 and 124, one may have thought, when a voltage is stored in the assembly A, to open the switch 130 of the assembly A using the signal SWA, and, when a voltage is stored in the assembly B, to open the switch 130 of the assembly B, using the signal SWB. However, the use of two different signals SWA and SWB could lead to the introduction of a shift in the wanted signal of the pixel, for example, due to the fact that the propagation times and/or the edges of the signals SWA and SWB and/or the threshold voltages of the corresponding transistors 130 can, in practice, be different. This may in particular lead to a different duration Td according to the considered assembly A or B, and therefore a shift in the wanted signal.

Figure 3:
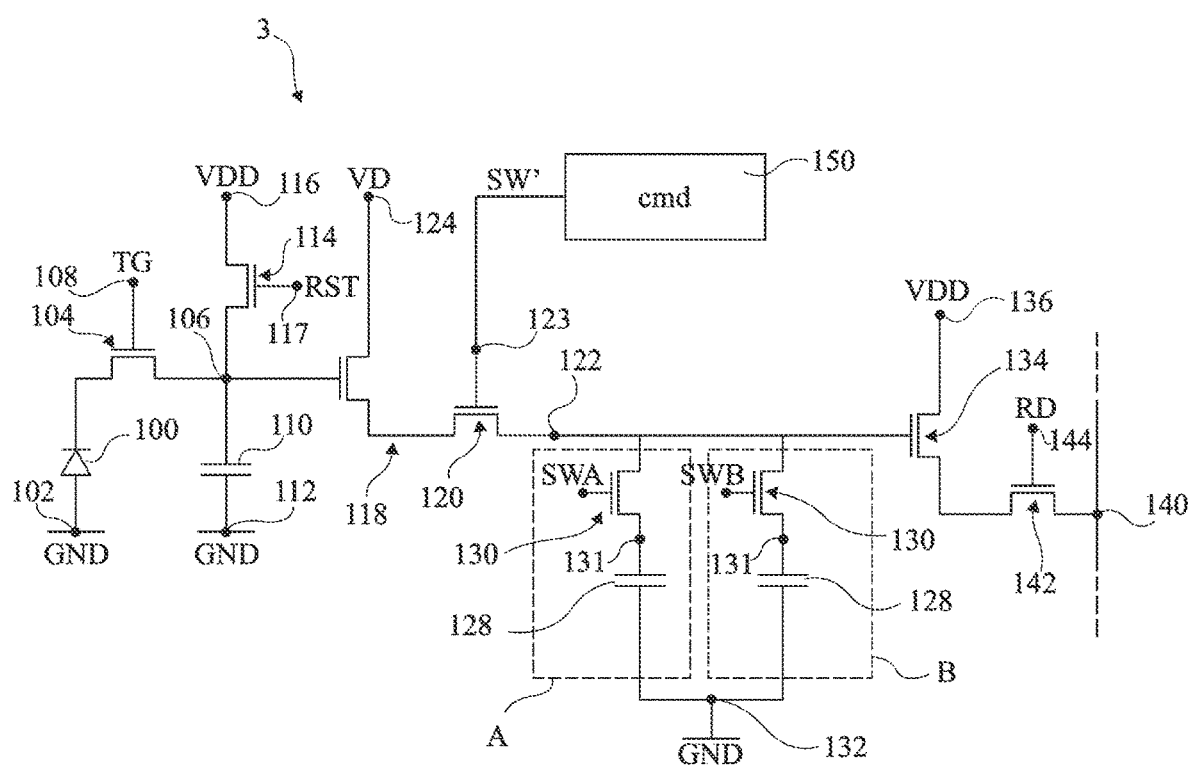
FIG. 3 shows another embodiment of a circuit of a pixel of a global-shutter sensor.

FIG. 3 shows another embodiment of a circuit of a pixel 3 of a global-shutter sensor. Like the pixel 1, the pixel 3 is part of a pixel matrix 3 of a global-shutter image sensor. Only the differences between the pixel 1 of FIG. 1 and the pixel 3 of FIG. 3 are described in detail here.

In the pixel 3, like in the pixel 1, during a storage phase MEM-INIT or MEM-SIGNAL, it is provided that the current circulating between the nodes 122 and 124 is interrupted using an identical signal irrespective of the assembly A or B in which the storage is done.

However, in the pixel 3, this interruption of the current is implemented using a control signal SW' of the switch 120, and not using the control potential Vech applied to the node 112.

Thus, the pixel 3 differs from the pixel 1 in that:
the control terminal of the switch 120 (node 123) receives the signal SW' and not the signal SW;
the control circuit 150 (cmd) of the pixel 3, and more generally of the pixels 3 of the image sensor, does not provide the control potential Vech, or the signal SW, but is configured to supply the signal SW'; and
the node 112 is placed at a fixed potential, preferably the ground potential GND.

Figure 4:
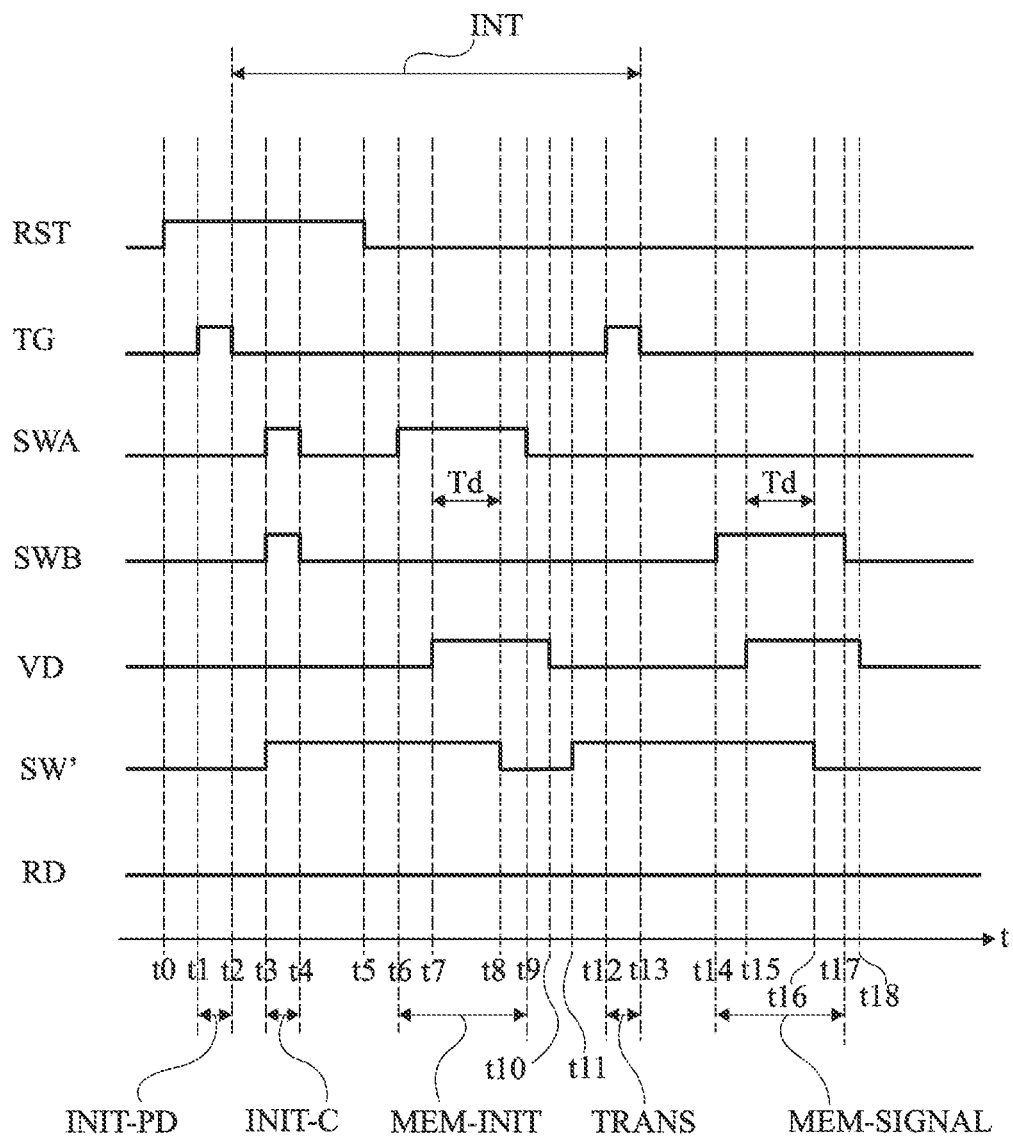
FIG. 4 shows timing diagrams illustrating an implementation mode of a control method of the pixel of FIG. 3.

FIG. 4 shows timing diagrams illustrating an implementation mode of a control method of the pixel 3 of FIG. 3.

Only the differences between the timing diagrams of FIG. 2 and those of FIG. 4 are described in detail here.

In particular, relative to FIG. 2, in FIG. 4, the timing diagram of the signal SW is replaced by that of the signal SW'. Furthermore, relative to FIG. 2, in FIG. 4, the timing diagram of the signal Vech is eliminated.

In FIG. 4, the signal SW' is identical to the signal SW, with the difference that:
at the moment t8, separated from the moment t7 by the duration Td, the switch 120 is placed in the off state by controlling a switching of the signal SW' from its high level to its low level, the placement in the off state of the switch 120 interrupting the circulation of the current between the nodes 124 and 122;
at the moment t11, after the switch 130 of the assembly A has been switched to the open state (moment t9) and the signal VD has been switched to its low level (moment t10), the switch 120 is placed back in the on state by controlling a switching of the signal SW' from its low level to its high level; and
at the moment t16, separated from the moment t15 by a duration Td that is preferably identical to that separating the moments t7 and t8, the switch 120 is placed in the off state by controlling a switching of the signal SW' from its high level to its low level, the placement in the off state of the switch 120 interrupting the circulation of the current between the nodes 124 and 122.

The switching of the signal SW' described in relation with the moments t8, t11 and t16 is done simultaneously for all of the pixels 3 of the sensor.

In FIG. 4, the moment t18 marks the end of a global acquisition and storage phase of an image by the sensor. The reading of the voltages stored in the assemblies A and B is then done as indicated in relation with FIG. 2.

The pixel 3 and its control method benefit from the same advantages as those described in relation to the pixel 1 and its control method.

In embodiment variants that are not illustrated, it is provided that the pixel 1 or 3 comprises more than two assemblies A and B with a capacitance 128 in series with the switch 130 coupling the capacitance 128 to the node 122. Each additional assembly is then connected between the nodes 122 and 132, in a manner similar to the assemblies A and B. The switch 130 of each additional assembly is preferably commanded by a signal SWK specific to that assembly.

Each additional assembly makes it possible to store an additional voltage representative of a potential of the node 106. This, for example, makes it possible to store a first signal level after a first integration duration, for example, in the assembly A as was previously described, and a second signal level corresponding to a longer integration duration in an additional assembly 128, 130. Providing a plurality of integration durations for a same global integration phase makes it possible to select, once they have been read, the first or second signal level as a function of the light received during the integration phase, for example, to produce a high dynamic range (HDR) sensor.

Those skilled in the art are able to adapt the method described in relation with FIG. 2, respectively 4, in the case of a pixel 1, respectively 3, comprising more than two assemblies A and B of a capacitance 128 and a switch 130. In particular, the identical signal switching sequence making it possible to store a voltage in any one of the assemblies A and B is implemented to store a voltage in each additional assembly, the duration Td preferably being identical irrespective of the assembly in which this voltage is stored, and irrespective of the considered pixel. Furthermore, each voltage stored in an additional assembly is read during a reading phase identical to that described for each of the assemblies A and B, optionally by providing for placing the node 122 at a determined value before this reading phase, that is to say, by providing for initializing the node 122 before this reading phase.

Pixels 1 and 3 have been described comprising a capacitive element 110 connected between nodes 106 and 112. In practice, one or more intrinsic capacitances can be connected to the node 106, and form a capacitive divider bridge with the element 110. In the pixel 1, the person skilled in the art is then able to determine, in particular as a function of the intrinsic capacitance(s) of the node 106, the value of the capacitive element 110 and the amplitude of the difference in potential between the high and low levels of the signal Vech that allow the operation described in relation with FIG. 2, in particular that make it possible to obtain the desired variation in potential on the node 106 of the pixel 1.

In the pixel 3, the capacitive element 110 can correspond only to the intrinsic capacitances of the node 106.

Various embodiments and variants have been described. Those skilled in the art will understand that certain features of these embodiments can be combined and other variants will readily occur to those skilled in the art. In particular, those skilled in the art are able to adapt the described control methods to the case where a potential different from the ground is applied to the node 132, the voltage across the terminals of a capacitance 128, or to the node 122, then being referenced relative to this potential.

Furthermore, those skilled in the art are able to adapt the embodiments, modes of implementation and variants that have been described to the case where the charges accumulated in the area 100 and transferred to the node 106 are holes rather than electrons, in particular by adapting the supply potential, the type (N or P channel) of the MOS transistors and/or the high and low levels of the control signals.

Furthermore, those skilled in the art are able to adapt the embodiments, modes of implementation and variants that have been described to the case where the MOS transistors are replaced by transistors of other technologies and/or to the case where all or some of the switches of the pixels 1 and 3 are implemented differently than by MOS transistors.

Furthermore, in alternative embodiments (not illustrated), the device 104 of the pixel 1 of FIG. 1 or of the pixel 3 of FIG. 3 may be omitted, particularly in case of a pulsed illumination of the image sensor. In such embodiments, the cathode of the photodiode 100 is for example connected directly to the floating diffusion node 106. A global illumination pulse of the image sensor for example occurs between the storage of the initialization level and the storage of the signal level at the node 106, meaning that kT/C noise can be cancelled, despite the removal of the transfer gate 104. By removing the transfer gate 104, the pixel circuit will be thus smaller and cheaper to manufacture.

Finally, the practical implementation of the embodiments and variants described herein is within the capabilities of those skilled in the art based on the functional description provided hereinabove.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image sensor comprising:
   a matrix of pixels, each including:
      a first transistor and a first switch that are connected in series between a first node, configured to receive a first potential, and an internal node of the pixel, the first transistor having a gate coupled to a floating diffusion node of the pixel;
      a capacitive element having a first terminal connected to the floating diffusion node of the pixel; and
      a plurality of assemblies, each including a capacitance and a second switch connected in series with the capacitance and coupling the capacitance to the internal node of the pixel; and
   a control circuit configured to enable a voltage to be stored in a selected assembly of the assemblies of one of the pixels by closing the second switch of the selected assembly, and control an interruption of a current circulating between the first node and the internal node of the pixel, while the second switch of the selected assembly is closed, by:
      controlling a switching, from a first level to a second level, of a second potential applied to a second terminal of the capacitive element of the pixel; or
      controlling an opening of the first switch of the pixel.

2. The sensor according to claim 1, wherein, in each of the pixels, a source of the first transistor is not coupled to a constant-bias current source.

3. The sensor according to claim 1, wherein the control circuit is configured, while enabling to store the voltage in the selected assembly, to control a switching of the first potential applied to the first node, from a third level to a fourth level before the interruption of the current.

4. The sensor according to claim 3, wherein the control circuit is configured, while enabling to store the voltage in the selected assembly, to separate, by a duration, the control of the interruption of the current from the control of the switching, from the third to the fourth level, of the first potential applied to the first node, the duration being identical irrespective of the pixel and the selected assembly.

5. The sensor according to claim 3, wherein the control circuit is configured, while enabling to store the voltage in the selected assembly, to maintain the fourth level of the first potential applied to the first node, at least until the interruption of the current.

6. The sensor according to claim 3, wherein the control circuit is configured, to control an opening of the second switch of the selected assembly after the interruption of the current, and to maintain the fourth level of the first potential applied to the first node at least until the opening of the second switch.

7. The sensor according to claim 3, wherein the control circuit is configured to enable the voltage to be stored in the selected assembly by keeping closed the first switch of the pixel and the second switch of the selected assembly before controlling the switching, from the third to the fourth level, of the first potential applied to the first node.

8. The sensor according to claim 1, wherein the control circuit is configured to enable the voltage to be stored in the selected assembly by keeping closed the first switch of the pixel and the second switch of the selected assembly, at least until the interruption of the current.

9. A method, comprising:

controlling an image sensor that includes a matrix of pixels, each including:
- a first transistor and a first switch that are connected in series between a first node, configured to receive a first potential, and an internal node of the pixel, the first transistor having a gate coupled to a floating diffusion node of the pixel;
- a capacitive element having a first terminal connected to the floating diffusion node of the pixel; and
- a plurality of assemblies, each including a capacitance and a second switch connected in series with the capacitance and coupling the capacitance to the internal node of the pixel, the controlling including:

enabling a voltage to be stored in a selected assembly of the plurality of assemblies of one of the pixels by closing the second switch of the selected assembly;

controlling, while the second switch of the selected assembly is closed, an interruption of a current circulating between the first node and the internal node of the pixel, by:
- controlling a switching, from a first level to a second level, of a second potential applied to a second terminal of the capacitive element of the pixel; or
- controlling an opening of the first switch of the pixel.

10. The method according to claim 9, wherein, in each of the pixels, a source of the first transistor is not coupled to a constant-bias current source.

11. The method according to claim 9, wherein the storing comprises controlling a switching of the first potential applied to the first node from a third level to a fourth level before the interruption of the current.

12. The method according to claim 11, comprising keeping the first potential applied to the first node at the fourth level, at least until the interruption of the current.

13. The method according to claim 11, comprising:
opening the second switch of the selected assembly after the interruption of the current,
keeping the first potential applied to the first node at the fourth level at least until opening the second switch.

14. The method according to claim 11, comprising:
keeping closed the first switch of the pixel and the second switch of the selected assembly before the switching, from the third to the fourth level, of the first potential applied to the first node.

15. The method according to claim 9, comprising:
enabling respective voltages to be stored in respective selected assemblies of the plurality of assemblies of the plurality of pixels, by closing the second switch of each of the selected assemblies;
for each pixel of the plurality of pixels, controlling, while the second switch of the selected assembly of the pixel is closed, an interruption of a current circulating between the first node and the internal node of the pixel; and
for each pixel of the plurality of pixels, controlling a switching of the first potential applied to the first node of the pixel from a third level to a fourth level before the interruption of the current, wherein, for each pixel, an identical duration separates controlling the interruption of the current from controlling the switching, from the third level to the fourth level, of the potential applied to the first node of the pixel.

16. The method according to claim 9, wherein the storing includes keeping closed the first switch of the pixel and the second switch of the selected assembly at least until the interruption of the current.

17. An image sensor comprising:
a matrix of pixels, each including:
- a first transistor and a first switch that are connected in series between a first node, configured to receive a first potential, and an internal node of the pixel, the first transistor having a gate coupled to a floating diffusion node of the pixel;
- a capacitive element having a first terminal connected to the floating diffusion node of the pixel; and
- a plurality of assemblies, each including a capacitance and a second switch connected in series with the capacitance and coupling the capacitance to the internal node of the pixel; and a control circuit configured to:
- enable a voltage to be stored in a selected assembly of the assemblies of one of the pixels by closing the second switch of the selected assembly;
- control an interruption of a current circulating between the first node and the internal node of the pixel, while the second switch of the selected assembly is closed; and
- switch the first potential applied to the first node, from a first level to a second level that is higher than the first level, before controlling the interruption.

18. The sensor according to claim 17, wherein the control circuit is configured, while enabling to store the voltage in the selected assembly, to maintain the second level of the first potential applied to the first node, at least until the interruption of the current.

19. The sensor according to claim 17, wherein the control circuit is configured to control the interruption by controlling a switching, from a third level to a fourth level, of a second potential applied to a second terminal of the capacitive element of the pixel.

20. The sensor according to claim 17, wherein the control circuit is configured to control the interruption by controlling an opening of the first switch of the pixel.

* * * * *